April 27, 1965 M. RINDERSPACHER ETAL 3,180,778
PROCESS FOR CONTINUOUS PRODUCTION OF LAMINATED
STRUCTURES COMPRISING FOAMED PLASTIC LAYERS
Filed Dec. 13, 1960
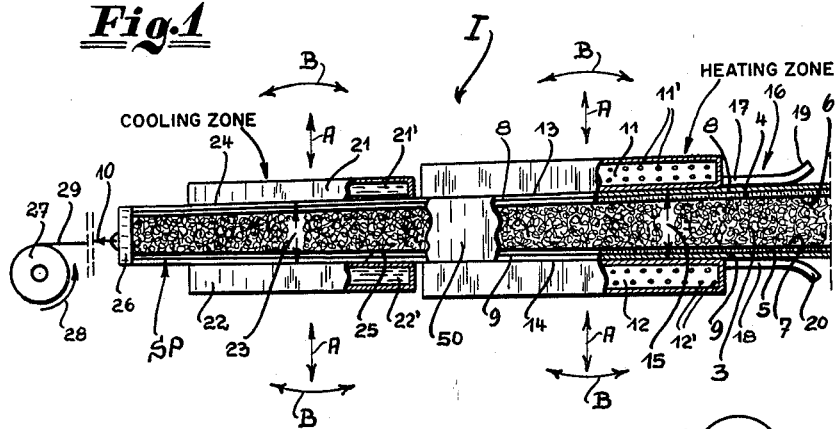
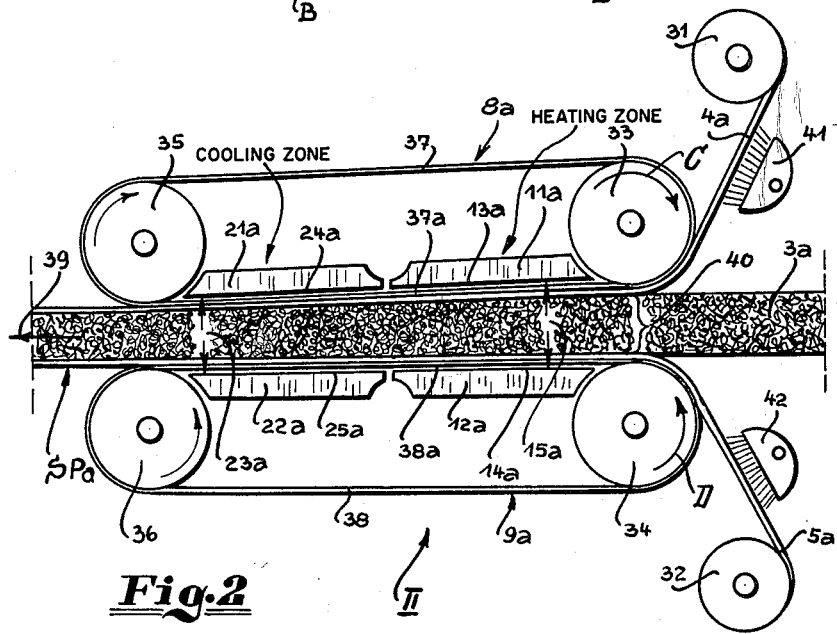
INVENTORS:
MAX RINDERSPACHER
EMIL STILLI
BY EUGEN BRUNNER
their ATTORNEY United States Patent Office 3,180,778
Patented Apr. 27, 1965

3,180,778
PROCESS FOR CONTINUOUS PRODUCTION OF LAMINATED STRUCTURES COMPRISING FOAMED PLASTIC LAYERS
Max Rinderspacher, Arlesheim, Emil Stilli, Basel, and Eugen Brunner, Birsfelden, Switzerland, assignors to Lonza Electric and Chemical Works Limited, Basel, Switzerland
Filed Dec. 13, 1960, Ser. No. 75,503
Claims priority, application Switzerland, Dec. 14, 1959, 81,818
7 Claims. (Cl. 156—311)

The present invention relates to a process and to an apparatus for the production of laminated structures, and more particularly to a process and apparatus for continuous production of laminated structures comprising at least one foamed plastic layer. Still more particularly, the invention relates to a process and apparatus for the production of laminated structures wherein at least one side of a prefoamed, e.g., fully expanded, cellular thermoplastic layer is bonded to a rigid, semirigid or flexible cover or outer layer. The term "cellular plastics" or "foamed plastics" as used in this description and in the appended claims, is intended to embrace expanded plastics of the open-cell type as well as expanded plastics of the closed-cell type. In one of its preferred forms, the laminated structures or sandwich panels obtained in accordance with our invention comprise closed-cell expanded plastic layers whose surfaces exhibit open pores due to the fact that the cores may be obtained by longitudinal slitting or slicing of heavier panels or slabs into two or more thinner sheets. In such instances, the cells located in the plane of the cut are open while the cells located in the body of the foamed plastic layer remain closed.

Laminated structures which comprise layers or cores of foamed plastic material are well known in the art, particularly in the production of insulating panels, reinforcing panels, moisture resistant panels and like products. We will now shortly outline some conventional processes for the production of laminated structures by simultaneously pointing out certain drawbacks and deficiencies of such processes which are overcome by the advent of our invention.

According to one prior proposal, the sides of the cellular plastic layer or the sides of the outer layers are coated with an adhesive, and the plastic layer is thereupon bonded to the outer layers in a press, often by simultaneous application of heat. This procedure cannot prevent the entry of air between the layers so that the bond between the adjacent layers is not continuous. In addition, the nature of the adhesive or the nature of the layers often necessitates alternate heating and cooling of the sandwich panel which brings about losses in heat energy and man hours, and results in reduced output of the press. Furthermore, the size of such laminated structures is limited by the size of presses available for such purposes.

Similar drawbacks are observable if the laminated structure is obtained by another known process according to which the foamed plastic core layer is formed during the actual laminating operation by introducing free-flowing expandable beads into the space defined by the outer layers. Such beads normally contain an integral blowing agent, and the foamed plastic is bonded to the outer layers as soon as it is formed therebetween.

This last-mentioned process is already practiced on a continuous basis by utilizing cores obtained by the expansion of polystyrene beads containing for each 100 parts by weight 5–30 parts by weight of a blowing agent in the form of an aliphatic hydrocarbon which boils in the temperature range of 35–60° C. The sandwich comprising two outer layers and a layer of polystyrene beads therebetween is passed through a heating zone wherein the polystyrene beads expand into an integral cellular structure and adhere to the outer layers, and is thereupon led through a cooling zone. The pressures necessary for insuring proper adherence of outer layers to the foamed plastic core layer are supplied solely by the expanding beads because no external pressure is applied to the outer layers while the sandwich structure passes through the heating and cooling zones. In fact, even such internal pressures disappear in the cooling zone as a result of contraction of the panel and liquefaction of the remaining blowing agent. This process cannot be utilized in connection with the production of laminated structures which comprise core layers of pre-expanded foamed plastic material (i.e., of a foam material which is formed with cells before being placed between the outer layers) and, in addition, this process cannot be resorted to if the foamed material consists of polyvinyl chloride or of mixed polymerizates, i.e., copolymers, of polyvinyl chloride.

Accordingly, it is an important object of the present invention to provide an improved process and apparatus for the production of laminated structures containing at least one layer of foamed plastic material which can be utilized in connection with many types of foamed plastics and which is particularly useful for the production of laminated structures comprising a layer of pre-expanded foamed plastic material.

Another object of the invention is to provide a process for the production of laminated structures, such as sandwich panels and the like, wherein the outer layer or layers for the foamed plastic layer may be selected from a wide variety of substances, which is particularly suited for bonding one or both sides of rigid or semirigid foamed layers to different types of outer layers, which can be utilized for bonding of non-elastic polyvinyl chloride foams free of softening agents or containing at most 10 percent of a softening agent, and which need not rely on the blowing agent to insure satisfactory bonding action between the foamed layer and the outer layer or layers.

A further object of the invention is to provide an apparatus for the production of laminated structures of the type comprising a foamed thermoplastic layer which is constructed and assembled in such a way that it may be utilized for the production of differently dimensioned laminated structures, which may be readily adapted to insure satisfactory bonding of foamed layers having widely different characteristics, and which may be utilized for the production of two- or three-layer laminated structures.

An additional object of the invention is to provide an apparatus of the just outlined characteristics which occupies little space despite the fact that it may be utilized for continuous production of very long laminated structures, which is equally useful for the production of structures which are in part laminated and in part consist of a single layer, and which is constructed and assembled in such a way as to insure that the cellular structure of the foamed layer remains intact during the bonding operation.

A concomitant object of our invention is to provide an apparatus of the above described type which is constructed and assembled in such a way that it simultaneously controls not only the thickness but also the width of the continuously formed laminated structure, which prevents the inclusion of air bubbles between the bonded layers, and which can be utilized for the production of laminated structures wherein the adhesive coats must be heated to a temperature higher than heretofore considered safe for the foamed layer without in any way damaging the cellular structure of the foamed layer.

Still another object of the invention is to provide apparatus of the above outlined characteristics which may be utilized for the bonding of rigid, semirigid or flexible foamed layers with one or two flexible, semirigid or rigid outer layers.

With the above objects in view, the invention resides in the provision of a process for continuous production of laminated structures by bonding a pre-expanded foamed plastic layer with at least one outer layer which comprises the steps of providing at least one of the layers with an adhesive coat, moving the layers through a heating zone at the same rate of speed and in the same direction in such a way that the adhesive coat is located between the layers, subjecting the layers to an exterior compressive force over at least a portion of the heating zone while the layers pass through said heating zone so that the layers are bonded to each other, moving the layers through a cooling zone, and at least maintaining said outer layer or layers pressed against the foamed plastic layer over at least a portion of the cooling zone while the layers pass through said cooling zone.

The novel process is especially suited for the production of laminated structures wherein the foamed layer consists of fully expanded thermoplastic foam material, i.e., of a foam material whose cellular structure assumes its final shape before it comes into contact with one or two outer layers. It has been found that the process is also suited for the production of laminated structures wherein the foamed plastic layer consists of polyvinyl chloride or of mixed polymerizates of polyvinyl chloride though, and as will be pointed out hereinafter, it is equally possible to utilize many other types of pre-expanded foamed plastic materials. Furthermore, the novel process is not limited to the bonding of commercially available pre-expanded foamed plastic layers to outer layers consisting of paper and like readily bondable fibrous substances, but is equally useful for the production of laminated structures whose outer layers consist of sheet metal, thin veneers of wood, or sheets of synthetic plastic material, particularly plates of hard polyvinyl chloride or softened foils consisting of polyvinyl chloride. Still further, the novel process may be utilized in the production of laminated structures whose outer layers consist of textile materials regardless of whether the textile materials are of the close-mesh or wide-mesh type, and regardless of whether the textile materials are provided with embossed or printed designs.

If the foamed plastic layer is of the closed-cell type, it preferably comprises a blowing agent which is not readily diffusible through the cell walls, e.g., the blowing agent may be nitrogen which maintains the cells under pressure even if the material of the foamed layer is comparatively soft. The previously described conventional process for continuous production of laminated structures is utterly impractical in connection with such foamed materials because, in order to introduce a gas from the outside or to bring about the decomposition of a chemical blowing agent which is incorporated in the starting material of the foamed layer, one must resort to extremely high pressures and to gelation temperatures in an autoclave or in a molding press.

The improved process is also suited for the production of laminated structures whose foamed layer consists of rigid or semirigid thermoplastic foam material with little or no elasticity, e.g., softener-free polyvinyl chloride, or a material containing no more than 10 percent by weight of a softening agent. Our invention is based on the recognition that a strong bond between a pre-expanded foamed plastic layer and one or more outer layers with an adhesive coat therebetween can be produced only if the adjacent layers are subjected to the action of a mechanical compressive force and if the compressive force is maintained for an extended period of time, preferably by simultaneous application of heat so that the bonding action occurs under the influence of heat and external pressure. Thus, instead of relying on the internal pressures generated in the foamed layer by a blowing agent, the novel process comprises the step of subjecting the layers of a laminated structure to an external compressive force while the layers are moved at the same rate of speed and in the same direction, and by generating the compressive force in such a way that its action is felt in a direction substantially perpendicular to the direction in which the layers advance.

In accordance with our invention, the advancing layers of a laminated structure are subjected to a compressive force while they advance through one or more treating zones of considerable length, i.e., the pressures are not applied along a line but are applied to substantial areas of the moving layers. It has been found that a strong bond between the adjacent layers may be brought about if the layers including a layer of fully expanded foamed plastic material are led through an elongated heating zone and are subjected to a compressive force at least over a portion of the heating zone whilst passing through said heating zone. We have discovered that the compressive force should preferably be applied in the first portion of the heating zone, and that this compressive force should be increased gradually at least while the layers pass through the first portion of the heating zone. Subsequent to their passage through the elongated heating zone, the bonded layers are caused to pass through an elongated cooling zone wherein an exterior force acting against the outer layer or layers is maintained at least over a portion of the cooling zone at a magnitude which is at least sufficient to keep the outer layer or layers pressed against the foamed plastic layer, and at the most equal to the compressive force at the discharge end of the heating zone. In other words, the bonded layers are led through the cooling zone while being subjected to an exterior force sufficient to prevent any separation of the individual layers as a result of natural contraction during cooling. The progressively increasing exterior compressive force over at least part of the heating and/or cooling zone to which the layers passing through said heating or cooling zone are subjected is a mechanical reaction force produced by reducing the combined thickness of the layers even if gas pressures in the interior of the foamed layer are not generated or not increased as it passes through said zones. Such internal pressures will develop in the heating zone owing to thermal expansion of the layers and owing to the fact that the cell structure of the foamed layer contains entrapped gas. On the other hand the above mentioned exterior pressure maintained in at least the first portion of the cooling zone is applied even if the interior pressure of the foamed layer, if any, is reduced by cooling, and the exterior pressure must be regulated in such a way as to take into consideration the contraction of bonded layers during the cooling step. In accordance with a preferred embodiment of our process, the compressive force acting against the layers of the laminated structure in the cooling zone may be increased gradually at least in a portion of the cooling zone or even in the entire cooling zone so that the layers are progressively compressed at least in a portion of the heating zone and thereupon in a portion of or in the entire cooling zone.

At least in certain instances, it is not absolutely necessary that the first application of increasing compressive force be simultaneous with the application of heat to the layers of the laminated structure. Thus, it is equally possible to subject each outer layer to a heating action without the application of pressure before the outer layers come into contact with the respective sides of the foamed layer, to thereupon subject the adjacent layers to a compressive force without simultaneous application of heat, to maintain or to increase the compressive force while the layers are subjected to the action of heat, and to thereupon maintain or to increase the obtained state of compression during the cooling step. Such initial compression of the layers prior to the application of heat to the assembled laminated structure can be brought about by conveying the layers through a compressing zone in a funnel-shaped inlet before the layers enter the actual heating zone. The initial heating of the outer layer or layers may be carried out by infrared heaters; in such instances, the adhesive coat is adreadly applied to the outer layers.

In connection with certain types of foamed plastic materials, the heating of outer layers and/or of the foamed layer prior to the initial application of compressive force may be omitted if the initial compression will not damage the cellular structure of the foamed layer. However, as a rule, the application and increase of the compressive force is carried out simultaneously with the application of heat or, in some instances, the application of heat to the assembled laminated structure may precede the application of pressure. In most instances, the compressive force will be increased gradually throughout the entire heating zone, and the laminated structure, e.g., a sandwich panel comprising a core layer of foamed plastic and two outer layers or a panel comprising a foamed layer and a single outer layer, is thereupon subjected to at least slightly increasing compressive force as it passes through the cooling zone.

Of course, it will be readily understood that the exact magnitude of the compressive force which is applied externally to the layers in the heating and/or cooling zones will depend to a certain extent on the nature of the processed materials, i.e., on the nature of the foamed plastic layer, on the nature of each outer layer, and on the nature of each adhesive coat which is provided between the foamed layer and each outer layer and which may be applied either to the outer layer or layers or to the exposed side or sides of the foamed layer. Furthermore, such pressures will depend to a certain extent on the temperature in the heating zone and on the cooling temperatures in the last stage of the operation. It will be readily understood that the temperature and the compressive force should not exceed such magnitudes which would bring about a destruction of the cells in the foamed plastic layer, particularly a destruction of the cells which is not limited to the exposed surfaces of the foamed layer. Thus, the temperature in the heating zone should normally remain below the softening temperature if the foamed layer is rigid or semirigid. In the event that the temperature prevailing in the heating zone exceeds somewhat the softening temperature of the foamed layer, care should be taken that such elevated temperature is felt only in the outermost zone or zones of the foamed layer while the cellular structure in the interior of this layer remains unaffected. However, the danger of destroying the interior of the foamed layer is comparatively small because the material of this layer is a good heat insulator and also because the layers are moved through the heating zone at such a rate of speed that the elevated temperatures are sometimes felt in the outermost zones of this layer but not in its interior. On the other hand, it is often desirable to subject the layers to a temperature which is somewhat higher than the softening temperature of the foamed layer, particularly if the adhesive coat or coats consist of a material whose softening or melting temperature is somewhat higher than the softening temperature of the foamed layer. Thus, the elevated temperatures will then cause a softening and/or melting of the adhesive coats but will affect only the outermost zones of the foamed layer which are immediately adjacent to the adhesive coats. In such instances, the drop in temperature between the discharge end of the heating zone and the intake end of the cooling zone should be rather pronounced so that the heat transmitted to the adhesive coat or coats cannot affect the foamed layer.

The novel apparatus for the practice of our process comprises essentially a pair of spaced first elements which define between themselves a heating compartment, a pair of second elements defining between themselves a cooling compartment which communicates with and normally constitutes an aligned extension of the heating compartment, and conveyor means for moving the layers through the heating compartment and thereupon through the cooling compartment. At least one of said first elements is provided with heating means and at least one of said second elements is provided with cooling means, and these elements are formed with preferably smooth faces which are adjacent to the respective compartments and which guide the conveyor means through the heating and cooling zones. The faces of the elements are preferably adjustable in such a way as to vary the width and the changes in width of the respective compartments so that, by providing a heating compartment whose width diminishes in the direction in which the conveyor means advance the layers through the apparatus, the mutually inclined faces subject the outer layers to a compressive force. The arrangement of the faces bounding the cooling zones is analogous. Of course, it is not always necessary that the entire cooling or heating compartment diminish in width all the way between its respective ends as it is often sufficient if only a portion of the heating or cooling compartment diminishes in width so that the layers are subjected to a shorter or longer lasting gradually increasing compressive force as they advance through the apparatus.

Certain other features of the improved apparatus reside in the provision of specially constructed and mounted conveying means, in the provision of side walls which determine the width of the laminated structure, in the provision of auxiliary heating means for the outer layers of the laminated structure, and in the provision of specially dimensioned heating and cooling compartments such as are best suited to insure satisfactory bonding of a foamed plastic layer to one or two outer layers.

The novel features which are considered as characteristic of the invention are set forth in particular in the appended claims. The invention itself, however, both as to its construction and its method of operation, together with additional objects and advantages thereof, will be best understood from the following detailed description of certain specific embodiments when read in connection with the accompanying drawing, in which:

FIG. 1 is a fragmentary partly elevational and partly sectional view of an apparatus embodying one form of our invention wherein a sandwich panel is formed between two plate-like conveyors of finite length; and FIG. 2 is a schematic side elevational view of a modified apparatus which utilizes two endless conveyors.

Referring now in greater detail to the drawing, and first to FIG. 1, there is shown an apparatus I for the production of a laminated structure in the form of a sandwich panel SP whose core layer 3 consists of a pre-expanded sheet of foamed thermoplastic material. The exposed sides of the core layer 3 are bonded to a pair of outer layers 4, 5 which may consist of any of the previously enumerated materials, e.g., textile sheets, wood veneers, metallic sheets, plastic sheets, or a combination of the same. The means for feeding the outer layers 4, 5 to that part of the apparatus I which is shown in FIG. 1 may comprise suitable rolls or spools of the type which will be described in connection with FIG. 2. In certain instances, the feeding means may comprise a series of additional guiding and deflecting rolls whose exact construction and mounting form no part of the present invention. Before the outer layers 4, 5 are moved into actual contact with the respective sides of the core layer 3, their inner sides are provided with coats of a suitable adhesive substance, preferably an adhesive which will bond the outer layers to the core layer at an elevated temperature. In FIG. 1, the adhesive coats 6, 7 are indicated by two heavier lines and are assumed to be applied to the inner sides of the outer layers 4, 5 though it will be readily understood that the adhesive may be applied to the exposed sides of the core layer 3, or that each of the layers or laminations 3, 4, 5 may be provided with adhesive coats. The adhesive need not necessarily assume the form of a paste or liquid but may be applied as a powder which will melt at elevated temperatures to form a uniform adhesive coat as it passes through the apparatus I. As a rule, the pulverulent adhesive consists of a thermoplastic substance which is capable of forming a strong bond with the layers 3, 4 and 5 under the action of heat and pressure.

At the right-hand end of the apparatus I, the layers 3–5 are assumed to be loosely placed onto or that they adhere only lightly to each other. The unfinished sandwich consisting of the layers 3–5 and of the two adhesive coats 6, 7 is introduced between a pair of conveyors consisting of spaced plate-like members 8, 9 before it reaches the first treating zone. The finite length of the upper conveyor 8 preferably equals the length of the lower conveyor 9, and the dimensions of these conveyors at least equal the dimensions of the sandwich. It is desirable that the length of the plate-like conveyors 8, 9 exceed the length of the apparatus I so that the forward end portions of these conveyors project at least slightly from the left-hand end and that their rear end portions project from the right-hand end of the apparatus. The direction in which the sandwich is advanced by the conveyors 8, 9 is indicated by the arrow 10. As a rule, the width of the conveyors 8, 9 preferably exceeds at least slightly the width of the sandwich, i.e., the lateral edge portions of the conveyors project beyond the lateral edge portions of the layers 3–5.

It is preferred to form the conveyors of a material which is at least slightly flexible or at least slightly elastic, which is a good heat conductor, and whose coefficient of friction is sufficient to insure that the cover layers 4, 5 are entrained in the direction of the arrow 10. For example, the conveyors 8, 9 may consist of metallic material, such as steel, bronze, copper, or the like, and preferably assume the form of thin sheets or wire netting. Alternately, these conveyors may consist of heat-conducting sheets made of suitable textile or synthetic plastic material which may but need not contain metallic reinforcements. If the conveyors are neither woven nor intertwined but consist of continuous sheets or metallic layers, they may be provided with perforations or embossings in order to insure a stronger engagement with the adjacent outer layers 4, 5, thereby producing a relievo design on the outer surfaces of the layers 4, 5. In the event that the conveyors 8, 9 are flexible, the apparatus preferably comprises suitable guide rolls, not shown, which are located at its inlet and exit ends.

An important component part of the apparatus I consists of two spaced heating elements shown in the form of double-walled bodies 11 and 12 which extend along the opposite sides of the sandwich 3–7 and whose length is in the range of several decimeters, e.g., 0.4 m. These heating elements 11, 12 are located in that zone of the apparatus wherein the sandwich consisting of laminations 3–5 and adhesive coats 6, 7 is subjected to the action of heat and preferably pressure. The elements 11, 12 are respectively formed with smooth inner faces 13, 14 which come into full contact with the outer sides of the conveyors 8, 9 when the sandwich 3–7 is advanced in the direction indicated by the arrow 10. These inner faces 13, 14 define between themselves a tapering heating zone in the form of a compartment 15 whose cross-sectional area decreases progressively from the intake end toward the discharge end of the apparatus I. For the sake of clarity, the mutual inclination of the inner or heating faces 13, 14 is somewhat exaggerated in FIG. 1. It has been found that the distance between the rear (right-hand) ends of the heating elements 11, 12 at the intake end of the compartment 15 should exceed by between 5–10 percent their distance at the forward end, i.e., at the discharge end of the heating compartment. Preferably, but not necessarily, the intake end of the apparatus I is provided with a funnel 16 whose inner sides merge into the smooth inner faces 13, 14 of the heating elements 11, 12. This funnel 16 comprises an upper guide plate 17 and a lower guide plate 18, and the guide plates 17, 18 define between themselves a wedge-shaped space or compressing zone communicating with the heating zone in the compartment 15. The guide plates are respectively provided with outwardly bent end portions 19, 20 which constitute the actual inlet of the apparatus I. The main body portions of the guide plates are shown as mutually inclined in the same way as the inner faces 13, 14 of the heating elements 11, 12 so that the main part of the space defined by the funnel 16 forms a non-heated continuation of the heating compartment 15. It will be readily understood that the funnel 16 facilitates the introduction of stacked layers 3–5 and of the conveyors 8, 9 into the heating compartment or zone 15. The maximum height of the compressing zone within the funnel 16 immediately to the left of the end portions 19, 20 should approximate the combined thickness of the layers 3–5 plus the thickness of the adjesive coats 6, 7 and of the conveyors 8, 9 in unstressed condition of the sandwich. In other words, when the sandwich moving in the direction of the arrow 10 reaches the main body portions of the guide plates 17, 18, the individual components of this sandwich should be in full face-to-face contact with each other.

When the conveyors 8, 9 are set in motion in the direction of the arrow 10 to entrain the layers 3–5 in the same direction, the layers and the adhesive coats 6, 7 are progressively compressed as they pass through the tapering space defined by the funnel 16 toward the intake end of the heating compartment 15. The compressing action of the guide plates 17, 18 is substantially perpendicular to the general plane of the sandwich. Thus, the layers and the adhesive coats are subjected to a preliminary compressing action before they are subjected to action of heat in the compartment or zone 15. Depending on the nature of the core layer 3, of the layers 4, 5 and/or of the adhesive coats 6, 7, the sandwich may be heated prior to its entry into and/or during its passage through the funnel 16. For example, suitable heat radiating means may be located adjacent to the end portions 19, 20 or adjacent to the guide plates 17, 18 so that the sandwich is preheated before it reaches the actual heating zone in the compartment 15.

As stated above, the funnel 16 constitutes an optional feature of my apparatus which may be omitted, particularly if the core layer 3 consists of semirigid or flexible foamed plastic material. In such instances, the distance between the intake ends of the heating elements 11, 12 may be substantially equal to or even less than the combined thickness of the sandwich 3–7 plus the conveyors 8, 9 in unstressed condition so that an initial compression is necessary for introduction of the conveyors into the heating compartment 15. It is then preferred to form the right-hand ends of the heating elements with outwardly diverging lips similar to the end portions 19, 20 of the guide plates 17, 18.

Regardless of the manner in which the sandwich is introduced into the heating compartment 15, its layers are subjected to progressively increasing pressure as the sandwich advances between the heating elements 11, 12 in the direction of the arrow 10, this being due to the fact that the inner faces 13, 14 of the heating elements converge from the upstream to the downstream side of the compartment 15, i.e., from the intake end to the discharge end of the heating zone. Simultaneously, the elements 11, 12 emit heat so that the sandwich passing through the compartment 15 is transformed into a unitary body or panel SP before it leaves the left-hand or discharge end of the compartment 15. The magnitude of the pressure and the extent to which the sandwich is heated depend on the nature of the core layer, on the nature of the outer layers 4, 5 and/or on the nature of the adhesive coats 6, 7. The exact speed at which the conveyors 8, 9 are moved in the direction of the arrow 10 will vary slightly in dependency on the thickness of the individual layers, on the nature of the adhesive coats, on the pressure exerted by the inclined faces 13, 14, and on the heating action of the elements 11, 12. However, a person skilled in the art will encounter no difficulty whatever in determining the optimum rate of speed at which the sandwich is to be moved through the apparatus.

It is not necessary that the temperature of the heating elements 11, 12 remain the same throughout the entire length of the compartment 15. For example, it is often preferred to heat the right-hand portions of the faces 13, 14 adjacent to the funnel 16 more intensively than the left-hand portions of these faces adjacent to the discharge end of the compartment 15, i.e., the heating action upon the sandwich at the intake end of this compartment is more intensive than at the discharge end. Furthermore, it is equally possible to vary the inclination of the faces 13, 14, e.g., by forming these faces with differently inclined and even parallel portions. The inclination of the faces 13, 14 depends on the nature of the layers passing therethrough and, particularly at the discharge end of the compartment 15, the faces 13, 14 may be formed with parallel portions. In other words, it is sometimes sufficient to form the composite heating and compressing zone in the compartment 15 and in the space within the funnel 16 with at least one portion wherein the sandwich is subjected to a compressive force while the remainder of this composite zone may be bounded by substantially or fully parallel walls. It has been found that it is often advantageous to incline the faces 13, 14 in such a way that the width of the discharge end of the compartment 15 is between 5–10 percent less than the width of the intake end of this compartment.

As the sandwich panel SP emerges from the discharge end of the combined heating and compressing compartment 15, it is introduced into the cooling zone provided in a cooling compartment 23 which is defined by the inner faces 24, 25 of two cooling elements 21, 22. The distance between the inner faces 24, 25 of the respective cooling elements 21, 22 at the right-hand or intake end of the cooling compartment 23 should not exceed and is preferably equal to or even less than the distance between the faces 13, 14 at the discharge end of the heating compartment 15. In other words, the thickness of the sandwich panel SP formed in the heating compartment 15 should be maintained or even slightly reduced as the panel SP enters the cooling zone in the compartment 23. In the embodiment of FIG. 1, the inclination of the inner faces 24, 25 is the same as the inclination of the faces 13, 14, respectively, i.e., the width of the passage for the sandwich consisting of the layers 3–5 and of the adhesive coats 6, 7 decreases progressively from the intake end of the heating compartment 15 to the discharge end of the cooling compartment 23. The difference in width between the intake and discharge ends of the compartment 23 may be between 5–10 percent. The length of the cooling compartment 23 may be in the range of about 3 decimeters; its exact length depends on the material of the layers 3–5 and of the adhesive coats 6, 7, on the forward speed of the conveyors 8, 9, and on the temperature of the cooling faces 24, 25.

The thickness of the sandwich panel SP passing through the cooling compartment 23 decreases under the cooling action of the faces 24, 25; this is an additional ground for reducing the width of the cooling compartment in a direction to the left, i.e., toward its discharge end. However, regardless of such contraction under the cooling action of the faces 24, 25, the latter's inclination is normally selected in such a way that the sandwich panel is subjected to additional compressing action as it passes through the cooling zone in the compartment 23. In other words, the width of this compartment decreases more rapidly than necessary for merely maintaining the cooling faces 24, 25 in contact with the contracting sandwich panel. Therefore, it is not absolutely necessary to conform the mutual inclination of the faces 24, 25 to that of the faces 13, 14, i.e., the inclination of the cooling faces 24, 25 may be greater if the sandwich panel contracts rather rapidly as it passes through the compartment 23. However, in most instances, the inclination of the cooling faces 24, 25 is selected in such a way that the width of the compartment 23 at its intake end exceeds by between 5–10 percent its width at the discharge end.

The exact construction of the cooling elements 21, 22 forms no part of our invention. For example, these elements may comprise cooling means in the form of channels 21', 22', and each thereof may be provided with suitable intake and discharge ports, not shown, for the circulation of cold water or another cooling medium in the respective channels. It is desirable that the sandwich panel, while passing through the cooling zone in the compartment 23, should be subjected to a rapid cooling action. In such instances, the temperature in the heating compartment may be raised even beyond such temperatures which can cause substantial softening of the core layer 3, i.e., beyond a temperature which could eventually destroy the cell structure of the foamed core layer. Such high temperatures are often desirable in connection with certain types of adhesive materials. Of course, such comparatively high temperatures are felt only in the outer layers 4, 5, in the adhesive coats 6, 7 and in the outermost portions of the core layer 3, and the rapid cooling of the sandwich panel in the compartment 23 insures that the temperature of the core layer is reduced before it can damage the cellular structure. In other words, the apparatus I renders it possible to utilize such temperatures which, under other circumstances (without immediate cooling), could cause permanent damage to the foamed core layer. As is known, the foamed plastic is a good heat insulator so that the higher temperatures necessary in connection with certain types of adhesive coats 6, 7 cannot penetrate into the interior of the core layer but are felt only along its outer sides which become sufficiently soft to form a good bond with the outer layers 4 and 5.

The front ends of the conveyors 8, 9 are connected with a holding or entraining device 26, e.g., a suitable clamping means, which exerts on the sandwich panel SP and on the conveyors a pulling force in the direction of the arrow 10. For example, the means for pulling the conveyors 8, 9 in a direction to the left may consist of a cable drum 27 which is driven in the direction of the arrow 28 so as to take up a flexible element in the form of a cable or chain 29 whose rear end is connected with the entraining device 26.

The apparatus I is operated as follows:

In the first step, the attendant forms a sandwich by assembling the layers 3–5 and by placing the layers between the conveyors 8, 9. It is assumed that the inner sides of the outer layers 4, 5 are already provided with adhesive coats and that the front ends of the conveyors 8, 9 are located to the right of the funnel 16. In the next step, the entraining device 26 is secured to the forward ends of the conveyors 8, 9 and the drum 28 is rotated clockwise to pay out a requisite length of cable 29, i.e., such a length that the cable may pass through the cooling and heating zones in the respective compartments 23, 15 and through the compressing zone in the funnel 16 to be connected to the entraining device 26. Of course, the cable 29 may be introduced laterally between the pairs of heating and cooling elements provided that the lateral sides of the compartments 23, 15 remain open. It is often desirable to provide the apparatus I with readily removable and adjustable side walls which temporarily seal the lateral sides of the compartments 23, 15 when the apparatus is in actual use. Such side walls may be placed between the heating elements 13, 14 and cooling elements 21, 22 or directly between the conveyors 8, 9. If the side walls are inserted between the two conveyors, they may participate in the movement of the sandwich in the direction of the arrow 10. A portion of one such movable side wall 50 is shown in FIG. 1 between the elements 11, 12. In some instances, particularly when the core layer 3 consists of semirigid or flexible foamed material, the side walls prevent undue lateral expansion of the sandwich under the action of pressures to which the core layer is subjected as it passes through the compartments 15 and 23. In other words, no subsequent trimming is necessary if the apparatus is equipped with side walls, such as the side wall 50, which determines the ultimate width of the sandwich panel SP.

It will be readily understood that the apparatus I may be provided with suitable adjusting means for the heating elements 11, 12 and/or for the cooling elements 21, 22. Such adjusting means are utilized for varying the pressure to which the sandwich or the completed sandwich panel SP is subjected as it passes between the faces 13, 14 and/or 24, 25, as well as for varying the inclination of the elements 11, 12 and/or 21, 22. The directions in which these elements may be adjusted are indicated schematically by double arrows A and B. Of course, similar adjusting means may be provided for varying the position of the guide plates 17, 18 which form part of the funnel 16. Such adjusting means render it possible to utilize the apparatus I for the production of differently dimensioned laminated structures and to utilize different foamed core layers for the manufacture of sandwich panels and the like.

Furthermore, it requires no detailed explanation that the apparatus I may be utilized for the production of laminated structures which comprise a layer of foamed plastic and a single outer layer. In such instances, only one heating element transmits heat to the advancing sandwich, and only one cooling element exerts a cooling action. The other two elements merely serve as a means for properly guiding and for satisfactorily compressing the laminations.

The means for heating the elements 11, 12 may consist of heating wires 11', 12' or the like.

Referring now to FIG. 2, there is shown an apparatus II for the production of a sandwich panel SPa which comprises a core layer 3a of foamed plastic and two outer layers 4a, 5a. The layers or laminations 4a, 5a are respectively paid out by supply spools 31, 32 and thereupon pass about the idler sprockets 33, 34 of two endless conveyors 8a, 9a. The arrows C, D indicate that the idler sprockets 33, 34 are respectively rotated in clockwise and anticlockwise directions so as to move the layers 4a, 5a into contact with the exposed upper and lower sides of the core layer 3a. It is assumed that the inner sides of the layers 4a, 5a are already provided with adhesive coats, not shown in FIG. 2, so that the bonding operation may begin as soon as the sandwich consisting of the core layer 3a and the outer layers 4a, 5a enters the intake end of the heating and compressing zone in the compartment 15a between the idler sprockets 33, 34. The conveyors 8a, 9a further comprise two driving sprockets 35, 36, respectively, which advance two endless belt-like members 37, 38, the latter engaging with the outer sides of the respective layers 4a, 5a in order to entrain the sandwich through and beyond the heating compartment 15a. It is assumed that the core layer 3a consists of a comparatively rigid foamed plastic material and that the outer layers 4a, 5a are at least moderately flexible so as to be readily storable on the supply spools 31, 32. The sprockets 35, 36 are driven by an arrangement which is not shown in FIG. 2, e.g., by an electric motor and by a suitable reduction gearing which causes the sprocket 35 to rotate in clockwise and the sprocket 36 to rotate in anticlockwise direction. The two conveyors 8a, 9a are normally driven at identical speeds.

The endless band-like members 37, 38 are preferably made of steel having a thickness of say 0.5 mm., and their inner runs 37a, 38a respectively engage the outer layers 4a, 5a to entrain the sandwich and the developing sandwich panel SPa in the direction indicated by the arrow 39. It will be readily understood that the sprockets 33, 34 may be driven with and at the same speed as the driving sprockets 35, 36, if desired.

Depending on the nature of adhesive coats applied to the inner sides of the outer layers 4a, 5a, these layers may be heated by auxiliary devices respectively shown at 41 and 42, e.g., infrared heaters, to such an extent that the adhesive coats are softened sufficiently for better adherence to the outer sides of the foamed plastic core layer 3a. Of course, in many instances, the apparatus II may operate without the auxiliary heating devices 41, 42. These heating devices are normally located shortly in advance of and close to the intake end 40 of the compartment 15a. At this intake end, the spacing between the inner runs of the endless steel members 37, 38 should not exceed the combined thickness of the layers 3a, 4a, 5a in uncompressed condition of the sandwich. In certain instances, particularly if the core layer 3a consists of semirigid or flexible foam material, the width of the intake end 40 may be somewhat (5–20 percent) less than the thickness of the sandwich in unstressed condition plus the thickness of the conveyor runs 37a, 38a. As stated before, the sandwiches processed in the apparatus II preferably comprise core layers of rigid or semirigid foamed plastic.

Adjacent to the intake end 40 of the compartment 15a, there are provided two heating elements 11a, 12a whose smooth inner faces 13a, 14a are respectively adjacent to the inner runs 37a, 38a of the endless band-like members 37, 38. The heating zone in the compartment 15a communicates with the cooling zone in a compartment 23a which is bounded by the inner faces 24a, 25a of two cooling elements 21a, 22a. Thus, the upper run 37a travels along the faces 13a, 24a, and the lower run 38a travels along the faces 14a, 25a. As in the embodiment of FIG. 1, the inclination of the faces 13a, 14a may but need not be the same as the inclination of the faces 24a, 25a. As shown in FIG. 2, the inclination of these faces is the same so that the composite passage consisting of heating and cooling zones in the respective compartments 15a, 23a tapers gradually to the left of the intake end 40. As shown, there is a small gap between the cooling compartment 23a and the aligned heating compartment 15a. It will be readily understood that the spacing between and the inclination of the heating elements 11a, 12a and/or of the cooling elements 21a, 22a may be adjusted in the same way as described in connection with FIG. 1. Furthermore, the length and/or the width of the compartments 15a, 23a may be substantially the same as in the apparatus I. For example, the width of the intake end 40 may be about 16 mm., and the taper of the compartment 15a in the direction of the arrow 39 may be such that the spacing between the left-hand ends of the heating elements 11a, 12a is about 15 mm. The spacing between the cooling elements 21a, 22a at the intake end of the compartment 23a may be the same as or even slightly less than the width of the discharge end of the compartment 15a, i.e., about 15 mm., and the compartment 23a then tapers in the direction of the arrow 39 so that the width of its discharge end between the driving sprockets 35, 36 is reduced to about 14 mm.

The just described specific construction of the apparatus II is especially suited for the production of sandwich panels whose core layer 3a consists of a comparatively rigid foamed polyvinyl chloride without any or at most with up to 10 percent by weight of a softening agent. Alternately, if the core layer 3a consists of a foamed polyester, it may contain up to 5 percent by weight of a softening agent. If the core layer consists of a semirigid or flexible foamed plastic material, at least the taper of the compartment 15a may be increased accordingly. The length of the heating elements 11a, 12a, as measured in the direction of the arrow 39, may be about 40 cm., and these heating elements are heated to a temperature of about 140° C. if the core layer consists of rigid polyvinyl chloride or of rigid polyester foam. The length of the cooling elements 21a, 22a is somewhat less, e.g., about 30 cm., and they may be cooled to room temperature by circulating tap water. The forward speed of the inner conveyor runs 37a, 38a is about 0.5 m. per minute, and this speed is readily adjustable by the drive for the sprockets 35, 36.

If desired, the apparatus may comprise suitable cutting means for reducing the length of the finished sandwich panel SPa into sections of such dimensions as are practical for storage, transportation and marketing. Such cutting means is then located to the left of the driving sprockets 35, 36. It will be noted that the apparatus II may operate without any pulling devices and without the entraining device 26 shown in FIG. 1, and that the length of the finished sandwich panel SPa is limited solely by the practical length of the layers 3a, 4a, 5a of which the sandwich panel consists.

The compressing action of the apparatus II upon the sandwich 3a, 4a, 5a in the zones of the compartments 15a, 23a is substantially the same as described in connection with FIG. 1. Thus, at least a portion of the compartment 15a tapers in such a way that the outer layers 4a, 5a are subjected to a compressive force and are pressed against the core layer 3a during the application of heat, and the height of the compartment 23a is preferably such that the panel SPa is maintained under at least some pressure even after having shrunk under the cooling action of the elements 21a, 22a. This insures that the panel emerging at the left-hand end of the apparatus II is free of entrapped air bubbles and that its thickness remains uniform throughout. Furthermore, the material of the core layer 3a is not affected by the heat prevailing in the compartment 15a so that it retains its open or closed cellular structure and that it adheres with great force to the outer layers 4a, 5a. As is known, air bubbles normally develop in the zones between the foamed core layer and the adjacent outer layers. It is preferred to maintain the compressive force in the cooling zone between the elements 21a, 22a at a magnitude which at least equals the compressive force at the discharge end of the compartment 15a.

*Example I*

The apparatus utilized was the one of FIG. 2, and the core layer 3a consisted of closed-cell foamed hard polyvinyl chloride with a thickness of 15 mm. This core layer was bonded to a pair of outer layers 4a, 5a consisting of hard polyvinyl chloride with a thickness of 0.5 mm. Each outer layer was provided with an adhesive coat in the manner as described in connection with FIG. 1. The adhesive coats consisted of a 25-percent solution of a copolymer of 75 percent vinyl chloride and 25 percent vinyl acetate. Each adhesive coat was dried prior to introduction into the heating zone in the compartment 15a, e.g., by the auxiliary heaters 41, 42. The quantity of adhesive was selected in such a way that, after evaporation of solvent, the inner sides of the outer layers 4a, 5a were coated with a mixed polymerizate weighing between 15–20 g. per square meter. The temperature of the heating faces 14a, 13a was about 140° C., and the cooling faces 24a, 25a were maintained at room temperature by circulating tap water. The sandwich panel emerging at the discharge end of the cooling zone in the compartment 23a had a thickness of 14 mm. and its three layers were permanently bonded to each other. The cellular structure of the core layer 3a remained unchanged.

*Example II*

The apparatus II was utilized again, but this time for the production of a laminated structure which consisted of a foamed plastic layer 3a and of a single outer layer 4a, i.e., one side of the foamed layer remained exposed. The rigid closed-cell foamed plastic material had a thickness of 11 mm., and the thickness of the outer layer 4a was 0.25 mm. This outer layer consisted of aluminum foil. The foil 4a was paid out by the supply spool 31 and the adhesive coat applied to its inner side was produced on the vinyl acetate, vinyl chloride and maleic acid basis. The spacing between the inner runs 37a, 38a of the conveyor members 37, 38 was adjusted in such a way that the width of the compartment 15a at the intake end 40 was 11 mm. and that the width of this compartment at its discharge end leading into the compartment 23a was 10.5 mm. The width of the cooling compartment 23a tapered from 10.5 mm. at its intake end to 10 mm. at its discharge end. The temperature of the cooling faces 24a, 25a was determined by tap water which was circulated in the upper cooling element 21a. The lower cooling element was inoperative and merely served as a support for the lower conveyor run 38a. The length of the cooling face 24a was 30 cm. and the sprockets 35, 36 were driven in such a way that the panel consisting of the layers 3a, 4a was advanced at a speed of 0.4 m. per minute. The two-layer product obtained in accordance with this example exhibited the same advantageous characteristics as the three-layer sandwich panel obtained in the Example I. Its final thickness was 10 mm., and the layers 3a, 4a were permanently bonded to each other. The closed-cell structure of the layer 3a remained unaffected.

Since the apparatus II, as described in the Example II, was utilized for the production of a panel structure consisting of two layers, the auxiliary heater 42 and the supply spool 32 remained idle during the entire operation. The above given values for the width of the compartments 15a, 23a were obtained by measuring from the inner side of the conveyor run 37a to the inner side of the conveyor run 38a. Futhermore, the heating element 12a also remained inoperative since the lower side of the foamed layer 3a remained exposed.

Of course, the apparatus of FIG. 2 is equally useful for the production of panel structures which are in part laminated and in part consists of a single foamed plastic layer. In such instances, predetermined lengths of layers forming the outer layer 4a and/or 5a are fed into the apparatus at certain intervals so as to be bonded to selected portions of the foamed layer 3a. Furthermore, if the thickness and rigidity of the outer layer of layers 4a, 5a are such that these layers cannot be stored on supply rolls 31, 32, the apparatus comprises other types of feeding devices which move the rigid outer layers into the compartment 15a at the same speed at which the foamed layer 3a is advanced by the conveyors 8a, 9a. For example, the thickness of say an aluminum layer 4a may be such that the layer cannot be rolled onto the spool 31, or this layer may consist of wood veneer, of rigid synthetic plastic material, or of any other substance which can be bonded with the foamed layer to form a useful panel structure.

Alternately, each side of the foamed layer 3a may be bonded to a different outer layer, e.g., the layer 4a may consist of aluminum foil and the layer 5a may consist of hard polyvinyl chloride. It is equally possible that one side of the foamed layer 4a must be provided with a continuous flexible outer layer 4a of thin aluminum foil (as in the Example II), and that the other side must be coated at spaced intervals with a rigid plastic or metallic outer layer 5a. In such instances, the rigid outer layer may be delivered by a different feeding device which will protect it against excessive deformation and will lead this layer 5a into the intake end 40 of the heating compartment 15a. Of course, if the outer layer 4a must be bonded to the layer 3a at spaced intervals, the apparatus II may comprise a suitable cutting device which is disposed between the supply spool 31 and the idler sprocket 33 to slit the outer layer 4a at predetermined intervals so that the operation of the apparatus II need not be interrupted even though the upper side of the layer 3a is without a continuous outer layer.

*Example III*

The apparatus II of FIG. 2 was utilized again for the production of a sandwich panel SPa which was composed of a core layer 3a consisting of an open-cell type rigid polyurethane foam with a thickness of 16 mm. (before introduction into the apparatus) and with a specific weight of 0.08 g./cm.$^3$, and of two hard polyvinyl chloride outer layers 4a, 5a each having a thickness of 0.5 mm. Each outer layer or foil was coated with an adhesive consisting of a mixed polymerizate of vinyl chloride and vinyl acetate. The outer layers 4a, 5a were heated by the auxiliary heaters 41, 42, respectively, so that the adhesive coats were softened and became tacky before coming into actual contact with the outer sides of the foamed layer 3a. The sandwich 3a, 4a, 5a with a combined thickness of 17 mm. was introduced through the intake end 40 whose width, too, was 17 mm. The width of the compartment 15a at its discharge end was 16 mm., and the width of the cooling compartment 23a at the latter's discharge end was 15 mm. The elements 11a, 12a were heated to 140° C., and the elements 21a, 22a were cooled by circulating tap water. The very strong and rigid sandwich panel SPa was stored for a short period of time and, after such storage, it was found that its thickness increased to 17 mm.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A process for continuous production of laminated structures by bonding a preexpanded, rigid, foamed plastic layer of the closed-cell type formed essentially of a material selected from the group consisting of polyvinyl chloride and copolymers thereof, with at least one outer layer, said process comprising the steps of providing at least one of the layers with an adhesive coat; moving the layers through a heating zone at the same rate of speed and in the same direction in such a way that the adhesive coat is located therebetween and simultaneously heating the outer layer to such an extent that the heat penetrates at least to said adhesive coat; subjecting the layers to external compressive force while the layers pass through at least a portion of said heating zone whereby the layers are bonded to each other under the action of heat and pressure; moving the bonded layers through a cooling zone whereby the gas pressure in the closed cells of said foamed layer will be reduced; and subjecting the bonded layers to external progressively increasing compressive force sufficient to at least compensate said reduction in gas pressure in said closed cells while the layers pass through said cooling zone.

2. A process for continuous production of laminated structures by bonding a pre-expanded, rigid, foamed thermoplastic layer of the closed-cell type with at least one outer layer, said process comprising the steps of providing at least one of the layers with an adhesive coat; moving the layers through an elongated heating zone at the same rate of speed and in the same direction in such a way that the adhesive coat is located therebetween; subjecting the outer layer to the action of heat in said heating zone so that the heat penetrates through the outer layer and at least to the adhesive coat; subjecting the layers to external compressive force while the layers pass through said heating zone whereby the layers are bonded to each other under the action of heat and pressure; moving the layers through an elongated cooling zone; and subjecting the layers to external progressively increasing compressive force while said layers pass through said cooling zone.

3. A process for continuous production of laminated structures by bonding a pre-expanded, rigid, foamed thermoplastic layer of the closed-cell type formed essentially of a material selected from the group consisting of polyvinyl chloride and copolymers thereof, with at least one outer layer, said process comprising the steps of providing at least one of the layers with an adhesive coat adapted to be activated by exposure to an elevated activating temperature; moving the layers through a compressing zone at the same rate of speed and in the same direction in such a way that the adhesive coat is located therebetween so as to subject the layers to an increasing external compressive force while the layers move through said compressing zone; simultaneously heating the layers so as to subject the outer layer to the action of heat so that the heat penetrates through the outer layer and a least to the adhesive coat heating the latter to at least said elevated activating temperature so that the layers are bonded to each other under the action of heat and pressure immediately thereafter moving the thus bonded layers through a cooling zone so as to cool said adhesive coat below said activating temperature; and subjecting the bonded layers while the same pass through at least a portion of said cooling zone to progressively increasing external compressive force sufficient to maintain the layer at least in a state of compression equal to that in which they are discharged from the heating zone.

4. A process as set forth in claim 1, wherein said outer layer consists of synthetic thermoplastic material.

5. A process as set forth in claim 1, further comprising the step of heating said outer layer before the layers are moved through the heating zone.

6. A process as set forth in claim 3, further comprising the step of heating said adhesive coat on at least one of said layers before the layers are moved through said compressing zone.

7. In a process for the production of laminated structures by placing an adhesive coat adapted to be activated at an elevated activating temperature between a pre-expanded rigid foamed plastic layer of the closed-cell type formed essentially of a material selected from the group consisting of polyvinyl chloride and copolymers thereof, and an outer layer and by thereupon bonding the layers under application of pressure and at least said elevated temperature, the steps of moving the bonded layers while still hot through a cooling zone in which said adhesive coat is cooled below said elevated temperature; and during cooling of said adhesive coat to below said elevated activating temperature subjecting the bonded layers to progressively increasing external compressive force.

References Cited by the Examiner

UNITED STATES PATENTS

| | | | |
|---|---|---|---|
| 2,356,826 | 8/44 | Coss et al. | 156—311 |
| 2,542,901 | 2/51 | Chaffee | 156—311 |
| 2,543,101 | 2/51 | Francis | 154—101 |
| 2,724,676 | 11/55 | Randall et al. | 156—311 |
| 2,841,205 | 7/58 | Bird | 154—37 |
| 2,841,515 | 7/58 | Runton | 154—52.1 |
| 2,928,456 | 3/60 | Potchen et al. | 154—28 |
| 2,957,793 | 10/60 | Dickey | 154—100 |
| 2,962,407 | 11/60 | Aykanian | 154—100 |

EARL M. BERGERT, *Primary Examiner.*

CARL F. KRAFFT, *Examiner.*